(12) United States Patent
Kim

(10) Patent No.: US 12,309,563 B2
(45) Date of Patent: May 20, 2025

(54) ELECTRONIC DEVICE AND OPERATING METHOD FOR ELECTRONIC DEVICE

(71) Applicant: AMOSENSE CO., LTD., Cheonan-si (KR)

(72) Inventor: Jungmin Kim, Cheonan-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 286 days.

(21) Appl. No.: 18/022,974

(22) PCT Filed: Aug. 24, 2021

(86) PCT No.: PCT/KR2021/011267
§ 371 (c)(1),
(2) Date: Feb. 23, 2023

(87) PCT Pub. No.: WO2022/045725
PCT Pub. Date: Mar. 3, 2022

(65) Prior Publication Data
US 2023/0300533 A1    Sep. 21, 2023

(30) Foreign Application Priority Data

Aug. 24, 2020  (KR) .................. 10-2020-0106180

(51) Int. Cl.
*H04R 5/04*      (2006.01)
*G06T 7/70*      (2017.01)
*G10L 15/26*     (2006.01)

(52) U.S. Cl.
CPC ................. *H04R 5/04* (2013.01); *G06T 7/70* (2017.01); *G10L 15/26* (2013.01)

(58) Field of Classification Search
CPC .. H04R 5/04; G06T 7/70; G10L 15/26; G06F 3/165
See application file for complete search history.

(56) References Cited

U.S. PATENT DOCUMENTS

2009/0312871 A1   12/2009 Lee et al.
2018/0035237 A1*   2/2018 Norris ................... H04M 3/568
2019/0385613 A1*  12/2019 Mindlin ................. G10L 17/00
(Continued)

FOREIGN PATENT DOCUMENTS

JP     2019-176416 A     10/2019
KR     10-0785784 B1     12/2007
(Continued)

*Primary Examiner* — Fan S Tsang
*Assistant Examiner* — David Siegel
(74) *Attorney, Agent, or Firm* — Maschoff Brennan

(57) ABSTRACT

An electronic device is disclosed. An electronic device comprises: an image data receiving circuit configured to receive, from a camera, input image data associated with an image captured by the camera; a voice data receiving circuit configured to receive input voice data associated with the voices of speakers; a memory configured to store transform parameters for projecting a space coordinate system onto an image coordinate system on the image; and a processor, which determines a speaker's spatial location from the input voice data, converts same into the speaker's image location on the image, and inserts, into an input image, text associated with the speaker's voice according to the image location, so as to generate output image data.

12 Claims, 4 Drawing Sheets

(56) References Cited

U.S. PATENT DOCUMENTS

| | | |
|---|---|---|
| 2020/0174560 A1 | 6/2020 | Park et al. |
| 2021/0044913 A1* | 2/2021 | Häussler ................ G06T 13/205 |
| 2021/0209855 A1* | 7/2021 | Stokking ................... G06T 7/50 |

FOREIGN PATENT DOCUMENTS

| KR | 10-2017-0111450 A | 10/2017 |
|---|---|---|
| KR | 10-2019-0016683 A | 2/2019 |
| KR | 10-2020-0067641 A | 6/2020 |

* cited by examiner

[FIG. 1]
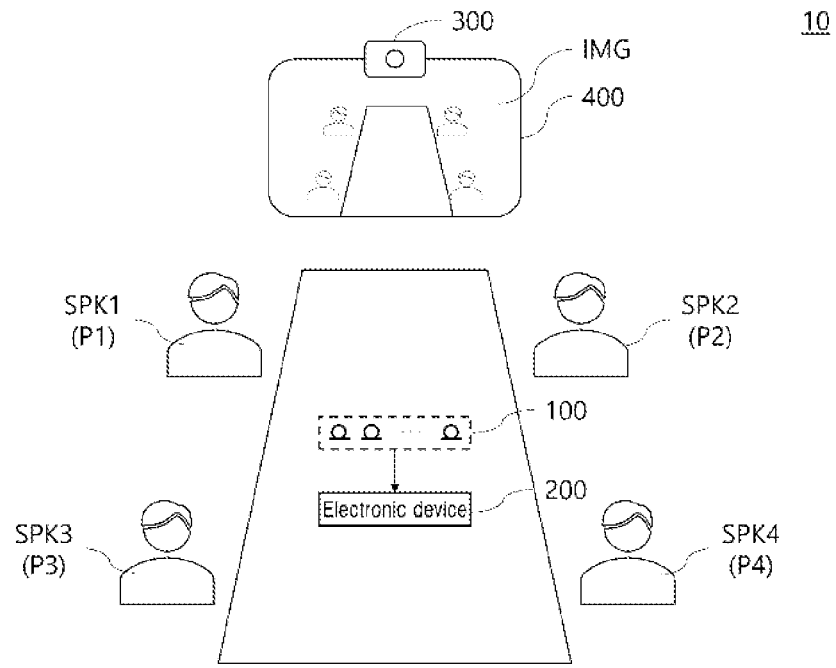
[FIG. 2]
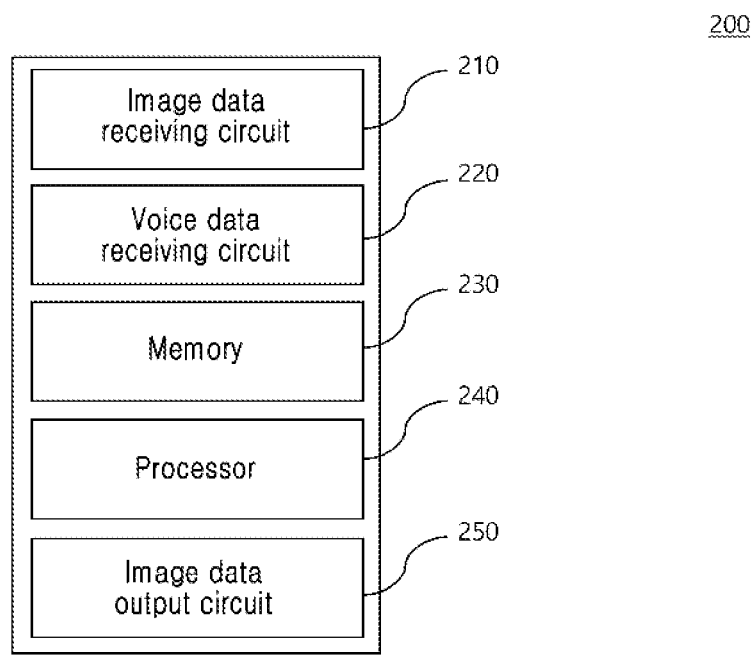

[FIG. 3]
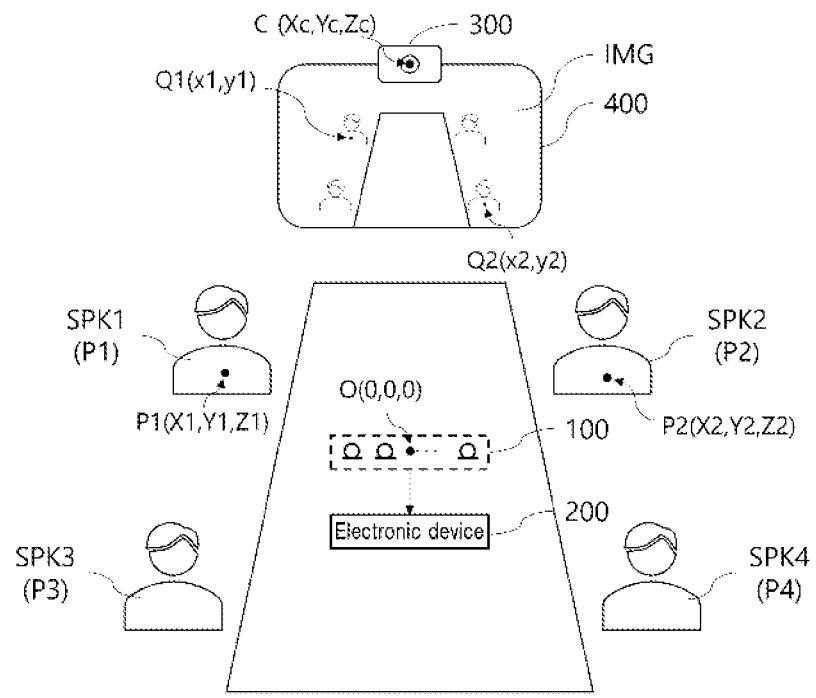
[FIG. 4]
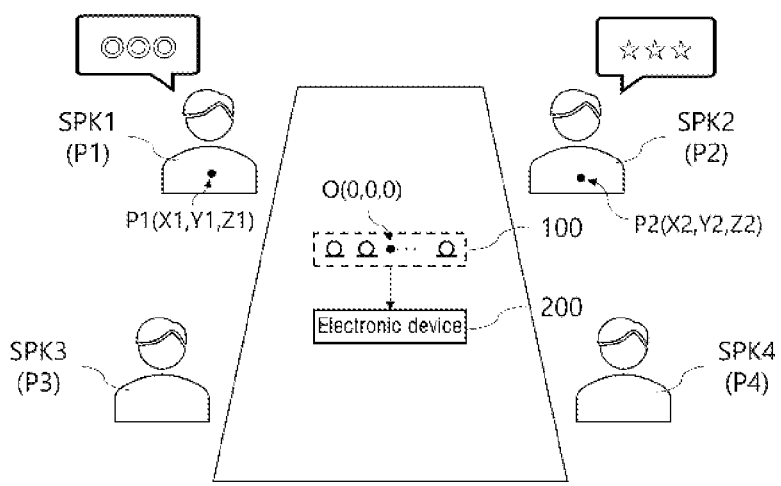

[FIG. 5]
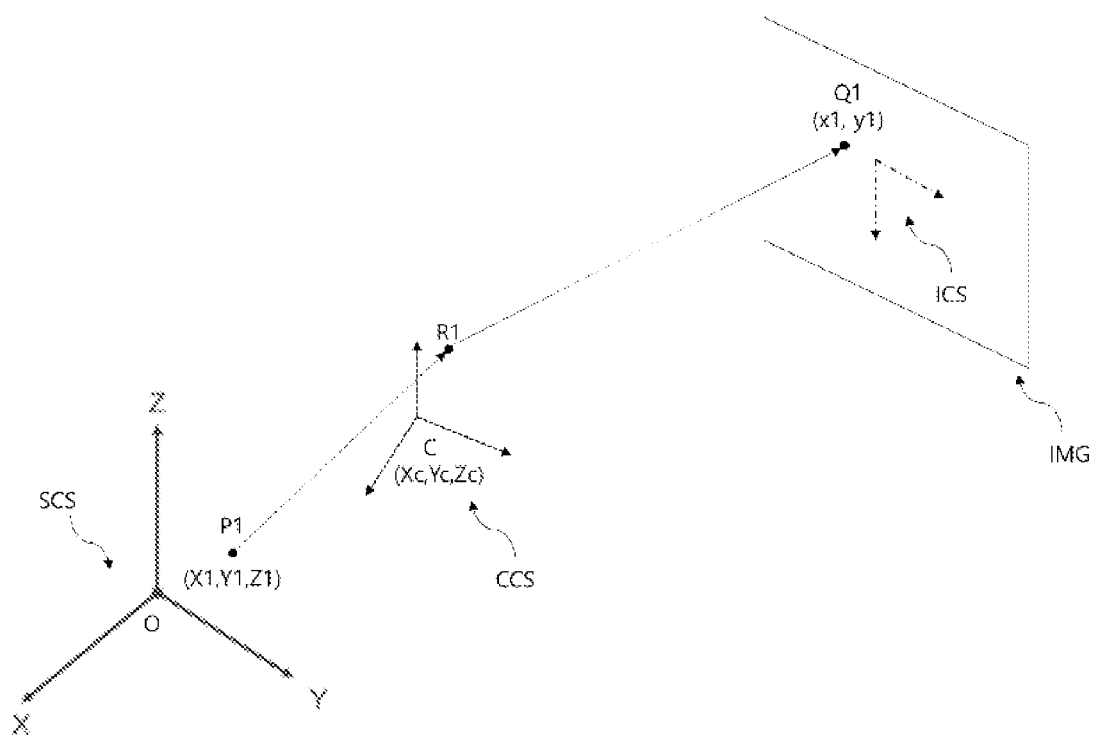
[FIG. 6]
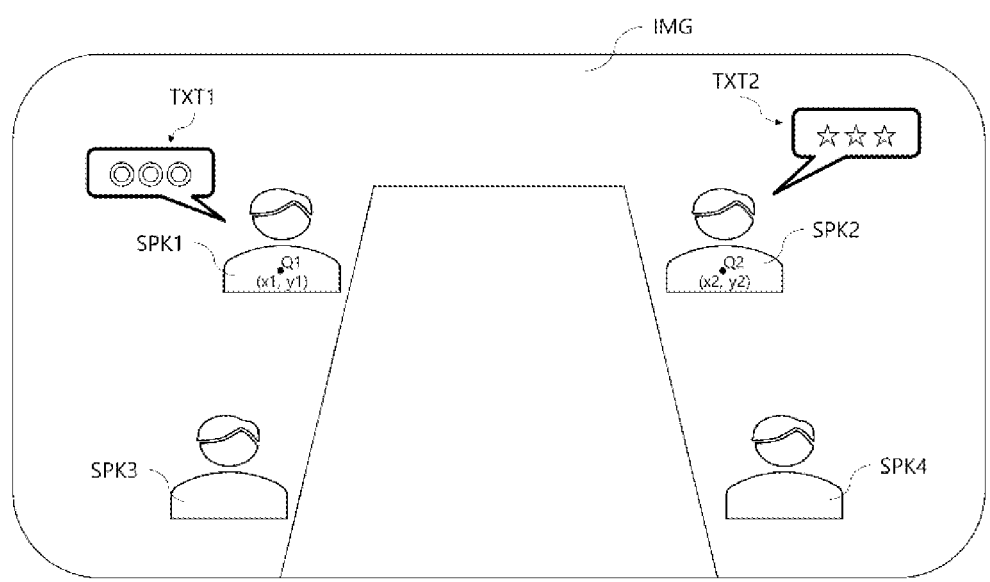

[FIG. 7]
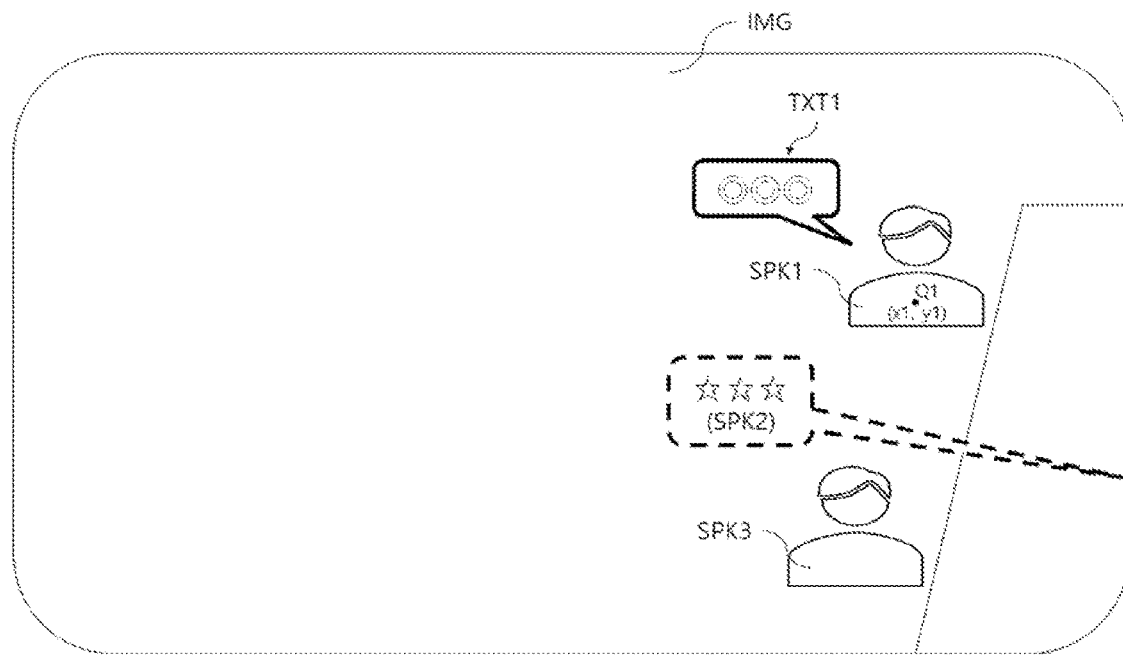
[FIG. 8]
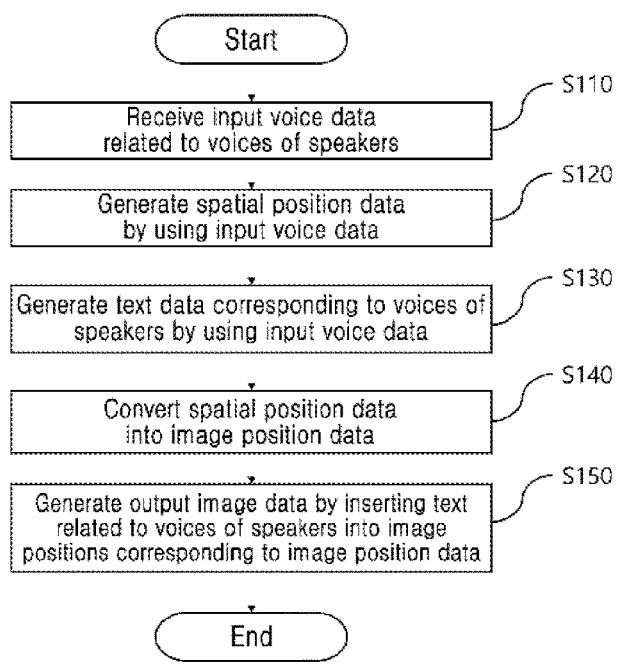

ELECTRONIC DEVICE AND OPERATING METHOD FOR ELECTRONIC DEVICE

TECHNICAL FIELD

Embodiments of the present disclosure relate to an electronic device and an operating method for an electronic device.

BACKGROUND ART

A microphone is a device which recognizes voice, and converts the recognized voice into a voice signal that is an electrical signal. In case that a microphone is disposed in a space in which a plurality of speakers are located, such as a meeting room or a classroom, the microphone receives all voices from the plurality of speakers, and generates voice signals related to the voices from the plurality of speakers. Accordingly, in case that the plurality of speakers pronounce at the same time, it is required to separate the voice signals of the plurality of speakers. Further, it is required to grasp which speaker each of the separated voice signals is caused by.

SUMMARY OF INVENTION

Technical Problem

An object of the present disclosure is to provide an electronic device and an operating method for an electronic device, which can judge positions of speakers by using input voice data and separate the input voice data by speakers.

Another object of the present disclosure is to provide an electronic device and an operating method for an electronic device, which can easily identify speakers of voices related to voice data by determining positions of speaker terminals, judging positions of speakers of input voice data, and identifying the speaker terminals existing at positions corresponding to the positions of the speakers.

Solution to Problem

An electronic device according to embodiments of the present disclosure includes: an image data receiving circuit configured to receive, from a camera, input image data related to an input image captured by the camera; a voice data receiving circuit configured to receive input voice data related to voices of speakers; a memory configured to store transform parameters for projecting a spatial coordinate system onto an image coordinate system on the image; a processor configured to generate output image data by using the input voice data and the input image data; and an image data output circuit configured to output the output image data, wherein the processor is configured to: generate first spatial position data representing a first spatial position on the spatial coordinate system of a first speaker among the speakers and first text data related to the voice of the first speaker by using the input voice data, convert the first spatial position data into first image position data representing a first image position on the image coordinate system of the first speaker based on the transform parameters, and generate the output image data by inserting a text related to the voice of the first speaker into the input image in accordance with the first image position based on the input image data, the first image position data, and the first text data.

An operation method for an electronic device according to embodiments of the present disclosure includes: receiving, from a camera, input image data related to an input image captured by the camera; receiving input voice data related to voices of speakers; generating first spatial position data representing a first spatial position on a spatial coordinate system of a first user among the speakers and first text data related to the voice of the first speaker by using the input voice data; converting the first spatial position data into first image position data representing a first image position on the image coordinate system of the image of the first speaker; generating the output image data by inserting a text related to the voice of the first speaker into the input image in accordance with the first image position based on the input image data, the first image position data, and the first text data; and outputting the output image data.

Advantageous Effects of Invention

According to the electronic device and the operating method for the electronic device according to embodiments of the present disclosure, it is possible to determine the spatial position of the speaker from the voice of the speaker, convert the spatial position of the speaker into an image position of the speaker on the image on which the speaker is displayed, and generate the image on which the text related to the voice of the speaker is displayed at the position corresponding to the image position of the speaker.

Accordingly, the user can easily identify who the speaker having pronounced the voice corresponding to the corresponding text is through the position of the text displayed on the image.

BRIEF DESCRIPTION OF DRAWINGS

FIG. 1 illustrates a system including an electronic device according to embodiments of the present disclosure.

FIG. 2 illustrates an electronic device according to embodiments of the present disclosure.

FIGS. 3 to 6 are diagrams explaining an operation of an electronic device according to embodiments of the present disclosure.

FIG. 7 is a diagram explaining an operation of an electronic device according to embodiments of the present disclosure.

FIG. 8 is a flowchart explaining an operation of an electronic device according to embodiments of the present disclosure.

DESCRIPTION OF EMBODIMENTS

Hereinafter, embodiments of the present disclosure will be described with reference to the accompanying drawings.

FIG. 1 illustrates a system including an electronic device according to embodiments of the present disclosure. Referring to FIG. 1, the system 10 may include a plurality of microphones 100, an electronic device 200, a camera 300, and a display device 400.

The system 10 according to embodiments of the present disclosure may receive input voice data related to voices of speakers SPK1 to SPK4, and generate voice data related to the voices of the speakers SPK1 to SPK4. That is, the system 10 may separate the voice data related to the voices of the speakers SPK1 to SPK4 from the input voice data related to the voices of the speakers SPK1 to SPK4. According to embodiments, the system 10 may determine positions of the speakers SPK1 to SPK4 by using the input voice data related to the voices of the speakers SPK1 to SPK4, and generate the voice data corresponding to the determined positions of the speakers SPK1 to SPK4.

Further, the system 10 according to embodiments of the present disclosure may display the voice data separated in accordance with the speakers SPK1 to SPK4 at the positions of the corresponding speakers SPK1 to SPK4 on an image IMG on the display device 400 represented by the speakers SPK1 to SPK4 as texts. For example, the system 10 may display first voice data related to a first voice of the first speaker SPK1 at the position of the first speaker SPK1 on the image IMG as the text. For example, the text may be displayed in the form of a speech bubble.

The speakers SPK1 to SPK4 may be positioned at positions P1 to P4, respectively. According to embodiments, the speakers SPK1 to SPK4 positioned at the positions P1 to P4 may pronounce the voices. For example, the first speaker SPK1 positioned at the first position P1 may pronounce the first voice, the second speaker SPK2 positioned at the second position P2 may pronounce the second voice, the third speaker SPK3 positioned at the third position P3 may pronounce the third voice, and the fourth speaker SPK4 positioned at the fourth position P4 may pronounce the fourth voice. Meanwhile, embodiments of the present disclosure are not limited by the number of speakers.

The voices of the speakers SPK1 to SPK4 may be received by the plurality of microphones 100. The plurality of microphones 100 may be disposed in a space in which the microphones 100 can receive the voices of the speakers SPK1 to SPK4.

The plurality of microphones 100 may generate voice signals VS1 to VSn related to the voices. According to embodiments, the plurality of microphones 100 may measure a pressure change of a medium (e.g., air) caused by the voices, generate the voice signals VS1 to VSn that are electrical signals based on the measured pressure change of the medium, and output the generated voice signals VS1 to VSn.

The plurality of microphone 100 may receive the voices of the speakers SPK1 to SPK4 positioned at the positions P1 to P4, respectively, and convert the voices of the speakers SPK1 to SPK4 into the voice signals that are the electrical signals. For example, the first microphone may receive the voices of the speakers SPK1 to SPK4, and generate the first voice signal related to the voices of the speakers SPK1 to SPK4. The first voice signal generated by the first microphone may correspond to at least one of the voices of the speakers SPK1 to SPK4.

The plurality of microphones 100 may output the voice signals. According to embodiments, the plurality of microphones 100 may transmit the voice signals to the electronic device 200. For example, the plurality of microphones 100 may transmit the voice signals to the electronic device 200 in accordance with a wired or wireless method.

The plurality of microphones 100 may be composed of beamforming microphones, and receive the input voices multi-directionally. According to embodiments, the plurality of microphones 100 may be disposed to be spaced apart from one another to constitute one microphone array, but the embodiments of the present disclosure are not limited thereto.

Each of the plurality of microphones 100 may be a directional microphone configured to receive the voices in a certain specific direction, or an omnidirectional microphone configured to receive the voices in all directions.

The electronic device 200 may be a computing device having an arithmetic processing function. According to embodiments, the electronic device 200 may be implemented by a computer, a notebook computer, a mobile device, a smart phone, or a wearable device, but is not limited thereto. For example, the electronic device 200 may include at least one integrated circuit having the arithmetic processing function.

The electronic device 200 may receive the input voice data related to the voices of the speakers SPK1 to SPK4, and separate (or generate) output voice data related to the voices of the speakers SPK1 to SPK4 from the input voice data.

According to embodiments, the electronic device 200 may receive the voice signals that are transmitted from the plurality of microphones 100, and obtain the input voice data related to the voices of the speakers SPK1 to SPK4 from the voice signals.

Meanwhile, although it is assumed, in the description, that the electronic device 200 receives the voice signals from the plurality of microphones 100 and obtains the input voice data related to the voices of the speakers SPK1 to SPK4, according to embodiments, it is also possible for the electronic device 200 to receive the input voice data related to the voices of the speakers from an external device.

According to embodiments, the electronic device 200 may be integrally formed with the plurality of microphones 100, but the embodiments of the present disclosure are not limited thereto.

The electronic device 200 may determine the positions of the speakers SPK1 to SPK4 (i.e., positions of voice sources) by using the input voice data related to the voices of the speakers SPK1 to SPK4. According to embodiments, the electronic device 200 may generate spatial position data representing the spatial positions of the voice sources (i.e., spatial positions of the speakers) from the input voice data related to the voices of the speakers SPK1 to SPK4 based on at least one of distances among the plurality of microphones 100, differences among times when the plurality of microphones 100 receive the voices of the speakers SPK1 to SPK4, respectively, and levels of the voices of the speakers SPK1 to SPK4.

That is, the spatial position data represents positions in space on the spatial coordinate system of the speakers SPK1 to SPK4 having pronounced the voices of the input voice data.

The electronic device 200 may separate the input voice data in accordance with the positions of the speakers (i.e., positions of the voice sources) based on the spatial position data of the voices.

Since it is possible to estimate the positions of the voice sources through the input voice data, each of the input voice data may correspond to a specific position. In this case, the electronic device 200 may generate the output voice data related to the voices pronounced from the positions of the speakers from the input voice data based on the spatial position data. That is, the output voice data may be related to the voices pronounced from the speakers SPK1 to SPK4.

For example, the electronic device 200 may generate the first output voice data related to the voice pronounced from the first position from the input voice data by using the first spatial position data representing the first position, and the first output voice data may be data related to the voice pronounced from the first speaker SPK1 at the first position.

For example, in case that the first speaker SPK1 and the second speaker SPK2 pronounce as overlapping each other in time, the voices of the first speaker SPK1 and the second speaker SPK2 overlap each other, and thus the voice signals generated by the plurality of microphones 100 correspond to the overlapping voices of the first speaker SPK1 and the second speaker SPK2. Accordingly, the input voice data also includes the voice data related to the voice of the first speaker SPK1 and the voice data related to the voice of the second speaker SPK2. As described above, the electronic device 200 may generate the spatial position data representing the respective positions of the first speaker SPK1 and the second speaker SPK2 from the overlapping input voice data related to the voices of the first speaker SPK1 and the second speaker SPK2, and generate the first output voice data related to the voice of the first speaker SPK1 and the second output voice data related to the voice of the second speaker SPK2 from the overlapping input voice data based on the spatial position data.

The camera 300 may capture an image, and generate image data in accordance with the result of image capturing. According to embodiments, the camera 300 may capture a still image or a moving image. For example, the camera 300 may capture an image of the space in which the speakers SPK1 to SPK4 are present.

According to embodiments, the camera 300 may include at least one lens, an image sensor configured to generate an image signal corresponding to an image input through the at least one lens, and an image signal processor (ISP) configured to generate image data by processing the image signal generated from the image sensor.

According to embodiments, for example, the camera 300 may be implemented in the form of a camcorder, a smartphone, a tablet, a notebook computer, or a TV, but the embodiments of the present disclosure are not limited thereto.

The camera 300 may transmit the image data generated in accordance with the image capturing to the electronic device 200. The image data transmitted to the electronic device 200 may be referred to as the input image data.

The display device 400 may visually display the image IMG corresponding to the image data by using the input image data. According to embodiments, the display device 400 may include a plurality of pixels and a driving circuit for driving the pixels, and the driving circuit may transmit the image signal corresponding to the input image data to the plurality of pixels, and the plurality of pixels may display the image IMG through light emission in response to the image signal.

Meanwhile, although FIG. 1 illustrates that the camera 300 and the display device 400 are combined with each other, the camera 300 and the display device 400 may not be connected to each other. For example, the camera 300 and the display device 400 may be positioned in different spaces.

According to embodiments, the display device 400 may receive the output image data output from the electronic device 200, and display the image IMG based on the output image data.

FIG. 2 illustrates an electronic device according to embodiments of the present disclosure. Referring to FIGS. 1 and 2, the electronic device 200 may include an image data receiving circuit 210, a voice data receiving circuit 220, a memory 230, a processor 240, and an image data output circuit 250.

The image data receiving circuit 210 may receive input image data. According to embodiments, the image data receiving circuit 210 may receive the input image data corresponding to the image captured by the camera 300.

The image data receiving circuit 210 may store the input image data in the memory 230.

The voice data receiving circuit 220 may receive input voice data related to the voices of speakers SPK1 to SPK4. According to embodiments, the voice data receiving circuit 220 may receive the input voice data related to the voices of speakers SPK1 to SPK4 in accordance with a wired or wireless communication method.

According to embodiments, the voice data receiving circuit 220 may include an analog-to-digital converter (ADC), receive analog type voice signals VS1 to VSn from the plurality of microphones 100, convert the voice signals VS1 to VSn into digital type input voice data, and store the converted input voice data.

According to embodiments, the voice data receiving circuit 220 may include a communication circuit that is communicable in accordance with the wireless communication method, and receive the input voice data through the communication circuit.

The memory 230 may store therein data required to operate the electronic device 200. According to embodiments, the memory 230 may include at least one of a nonvolatile memory and a volatile memory.

According to embodiments, the memory 230 may store transform parameters for projecting a spatial coordinate system on a space onto an image coordinate system in the image captured by the camera 300. That is, the transform parameters are parameters representing a relationship between the position of a specific object in the space and the position of a specific object in the image generated by capturing an image of the object by the camera 300.

For example, the memory 230 may store the transform parameters corresponding the position of the camera 300 on the spatial coordinate system, an image capturing direction (or angle) of the camera 300, a focal length of the camera 300, a principal point of the camera 300, and an asymmetric coefficient of the camera 300.

The processor 240 may control the overall operation of the electronic device 200. According to embodiments, the processor 240 may generate a control command for controlling the operations of the image data receiving circuit 210, the voice data receiving circuit 220, the memory 230, and the image data output circuit 250, and transmit the control command to the image data receiving circuit 210, the voice data receiving circuit 220, the memory 230, and the image data output circuit 250.

The processor 240 may be implemented by an integrated circuit having an arithmetic processing function. For example, the processor 240 may include a central processing unit (CPU), a micro controller unit (MCU), a digital signal processor (DSP), a graphics processing unit (GPU), an application specific integrated circuit (ASIC), or a field programmable gate array (FPGA), but the embodiments of the present disclosure are not limited thereto.

The processor 240 described in the description may be implemented by one or more elements. For example, the processor 240 may include a plurality of sub-processors.

The processor 240 may judge the positions of the speakers SPK1 to SPK4 (i.e., voice source positions of the voices) by using the input voice data related to the voices of the speakers SPK1 to SPK4, and generate spatial position data representing the positions of the speakers SPK1 to SPK4. For example, the processor 240 may store the spatial position data in the memory 230.

The processor 240 may generate the spatial position data representing the positions of the speakers SPK1 to SPK4 from the input voice data related to the voices of the speakers SPK1 to SPK4 based on at least one of distances among the electronic device 200 and the plurality of microphones 100, distances among the plurality of microphones 100, differences among times when the plurality of microphones 100 receive the voices of the speakers SPK1 to SPK4, respectively, and levels of the voices of the speakers SPK1 to SPK4.

The positions of the speakers SPK1 to SPK4 determined by the electronic device 200 may be relative positions based on the electronic device 200. That is, the spatial position data may represent the positions of the speakers SPK1 to SPK4 on the spatial coordinate system based on the electronic device 200. Alternatively, the positions of the speakers SPK1 to SPK4 determined by the electronic device 200 may be absolute positions.

In the description, the positions of the speakers SPK1 to SPK4 determined by the electronic device 200 may be referred to as spatial positions.

The processor 240 may separate the input voice data in accordance with the positions of the speakers (i.e., positions of the voice sources) based on the spatial position data representing the spatial positions of the speakers SPK1 to SPK4. For example, the processor 240 may generate the output voice data related to the voices corresponding to the positions of the speakers based on the input voice data and the spatial position data, and match and store the output voice data with the corresponding spatial position data.

According to embodiments, the processor 240 may generate text data related to the voices corresponding to the positions of the speakers based on the input voice data and the spatial position data. For example, the processor 240 may generate the text data by performing speech-to-text conversion of the output voice data.

That is, the output voice data may be data related to the voices of the speakers SPK1 to SPK4 positioned at positions P1 to P4, respectively, and the text data may be data related to texts of the voices of the speakers SPK1 to SPK4, respectively.

The processor 240 may convert the spatial positions of the speakers SPK1 to SPK4 into image positions (positions on image) of the speakers SPK1 to SPK4 in an image captured by the camera 300. According to embodiments, the processor 240 may convert the spatial positions on the spatial coordinate system of the speakers SPK1 to SPK4 into the image positions by projecting the same onto the image coordinate system of the image captured by the camera 300.

The processor 240 may convert the spatial position data representing the spatial positions on the spatial coordinate system of the speakers SPK1 to SPK4 into the image position data representing the image positions on the image coordinate system of the image captured by the camera 300 by using the transform parameters stored in the memory 230.

The processor 240 may generate the output image data by using the input image data received by the image data receiving circuit 210.

The processor 240 may generate the output image data by inserting content (e.g., text) related to the voices of the corresponding speakers SPK1 to SPK4 into the positions corresponding to the image positions of the speakers SPK1 to SPK4 in the image of the input image data. In other words, the processor 240 may generate the output image data for displaying the content related to the voices of the corresponding speakers SPK1 to SPK4 at the positions corresponding to the image positions of the speakers SPK1 to SPK4 in the image of the input image data.

For example, the processor 240 may generate the output image data by inserting the content related to the output voice data into the input image data in accordance with the image positions indicated by the image position data. For example, the processor 240 may synthesize the input image data and the content with each other in accordance with the image positions.

The image data output circuit 250 may output the output image data. According to embodiments, the image data output circuit 250 may output the output image data to the display device 400 in accordance with the wired or wireless communication method.

FIGS. 3 to 6 are diagrams explaining an operation of an electronic device according to embodiments of the present disclosure. Referring to FIG. 3, the speakers SPK1 to SPK4, the plurality of microphones 100, and spatial positions P1, P2, P3, P4, O, and C on the spatial coordinate system of the camera 300 are illustrated. The spatial positions P1, P2, P3, P4, O, and C illustrated in FIG. 3 are positions based on the plurality of microphones 100. For example, in case that the plurality of microphones 100 and the electronic device 200 are integrally implemented, the spatial positions illustrated in FIG. 3 become the positions based on the electronic device 200.

The camera 300 may capture the image of the speakers SPK1 to SPK4, and generate the input image data corresponding to the captured image IMG. The display device 400 may receive the input image data, and display the captured image IMG by using the input image data.

The speakers SPK1 to SPK4 may be displayed on the captured image IMG. In this case, since the spatial coordinate system that becomes the criterion in space is different from the image coordinate system that becomes the criterion in image, the positions of the speakers SPK1 to SPK4 (i.e., image positions) in the image become different from the positions in the space (i.e., spatial positions). For example, the first spatial position P1 of the first speaker SPK1 may differ from the first image position Q1. Accordingly, in order to calculate the image positions of the speakers SPK1 to SPK4, it is required to properly convert the spatial positions of the speakers SPK1 to SPK4.

The electronic device 200 according to embodiments of the present disclosure may convert the spatial positions of the speakers SPK1 to SPK4 into the image positions of the speakers SPK1 to SPK4 in the image IMG, and generate the output image data for displaying the texts related to the voices of the speakers SPK1 to SPK4 at the positions corresponding to the image positions of the speakers SPK1 to SPK4.

Referring to FIG. 4, the first speaker SPK1 pronounces a first voice "☉☉☉", and the second speaker SPK2 pronounces a second voice "☆☆☆".

The electronic device 200 may receive the input voice data related to (overlapping) the voice in which the first voice "☉☉☉" and the second voice "☆☆☆" overlap each other.

The processor 240 may generate first spatial position data representing the first spatial position P1 of the first speaker SPK1 and second spatial position data representing the second spatial position P2 of the second speaker SPK2 by using the overlapping input voice data. Meanwhile, although the spatial positions P1 and P2 are illustrated in the form of one point in FIG. 4, according to embodiments, the spatial positions P1 and P2 may mean a set of one or more points, that is, an area having a certain range.

Further, the processor 240 may generate the first output voice data related to the voice pronounced at the first spatial position P1 (i.e., voice of the first speaker SPK1) "☉☉☉" and the second output voice data related to the voice pronounced at the second spatial position P2 (i.e., voice of the second speaker SPK2) "☆☆☆" from the overlapping input voice data by using the spatial position data. That is, the processor 240 may separate and generate the first output voice data related to the voice "☉☉☉" and the second output voice data related to the voice "☆☆☆" from the input voice data in which the first voice "☉☉☉" and the second voice "☆☆☆" overlap each other. For example, the processor 240 may match and store the first output voice data with the first spatial position data, and match and store the second output voice data with the second spatial position data.

Further, according to embodiments, the processor 240 may generate the first text data representing the text corresponding to the first voice "☉☉☉" by using the first output voice data, and generate the second text data representing the text corresponding to the second voice "☆☆☆" by using the second output voice data.

The processor 240 may convert the spatial position data generated from the input voice data into the image position data representing the position on the image IMG. According to embodiments, the processor 240 may convert the spatial position data into the image position data by using the transform parameters stored in the memory 230.

Referring to FIG. 5, the processor 240 may convert the spatial position data representing the spatial position on the spatial coordinate system SCS into the image position data representing the image position on the image coordinate system ICS.

The processor 240 may convert the spatial position on the spatial coordinate system SCS on the space into the image position on the image coordinate system ICS on the image IMG. For example, the processor 240 may convert the first spatial position P (X1, Y1, Z1) on the spatial coordinate system SCS into the first image position Q1 (x1, y1) on the image coordinate system ICS.

According to embodiments, the processor 240 may convert the first spatial position P (X1, Y1, Z1) on the spatial coordinate system SCS into the first camera position R1 on the camera coordinate system CCS, and convert the first camera position R1 on the camera coordinate system CCS into the first image position Q1 (x1, y1) on the image coordinate system ICS.

For example, the processor 240 may convert the first spatial position P (X1, Y1, Z1) on the spatial coordinate system SCS into the first camera position R1 on the camera coordinate system CCS based on external transform parameters determined by at least one of the position of the camera 300 on the spatial coordinate system and the image capturing direction (or angle) of the camera 300.

For example, the processor 240 may convert the first camera position R1 on the camera coordinate system CCS into the first image position Q1 (x1, y1) on the image coordinate system ICS based on internal transform parameters determined by at least one of a focal length of the camera 300, a principal point of the camera 300, and an asymmetric coefficient of the camera 300.

According to embodiments of the present disclosure, the processor 240 may convert the spatial position of the speakers SPK1 to SPK4 into the image position on the image IMG.

Referring to FIG. 6, the processor 240 may generate the output image data for displaying the texts related to the voices of the speakers SPK1 to SPK4 on the image IMG corresponding to the input image data. According to embodiments, the processor 240 may generate the output image data by inserting the texts related to the voices of the speakers SPK1 to SPK4 into the input image captured by the camera 300 at the image positions corresponding to the image position data.

According to embodiments of the present disclosure, the processor 240 may generate the output image data by inserting the texts related to the voices of the speakers SPK1 to SPK4 into the input image captured by the camera 300 at the positions of the speakers SPK1 to SPK4 (i.e., image positions) in the image IMG. Accordingly, the user can easily identify who is the speaker having pronounced the voice corresponding to the text through the position of the text that is displayed on the image.

Further, for example, in case that at least a part of the second speaker SPK2 is positioned on the right of the image display area, the processor 240 may generate the output image data by inserting the text for identifying the second speaker SPK2 into the input image together with the second text TXT2 related to the second voice "☆☆☆". In case that the second speaker SPK2 is not displayed on the image, it is not identified who is the second speaker SPK2 through the display position of the second text TXT2, and thus the text (e.g., name) for identifying the second speaker SPK2 is displayed together with the second text TXT2.

The processor 240 may generate the output image data by inserting the first text TXT1 related to the first voice "☉☉☉" of the first speaker SPK1 at the position corresponding to the first image position Q1 of the first speaker SPK1 of the input image IMG corresponding to the input image data and inserting the second text TXT2 related to the second voice "☆☆☆" of the second speaker SPK2 at the position corresponding to the second image position Q2 of the second speaker SPK2.

For example, the processor 240 may convert the first output voice data of the first speaker SPK1 into the text data, and insert the first text TXT1 related to the first voice "☉☉☉" of the first speaker SPK1 at the position corresponding to the first image position Q1 of the first speaker SPK1 of the image IMG of the input image data by using the text data. For example, the processor 240 may insert the first text TXT1 at the position having a predetermined offset against the first image position corresponding to the first image position data.

The processor 240 may generate first setting data for determining a size, a position, a form, and a shape of an area on which the first text TXT1 related to the first voice "☉☉☉" is to be displayed based on the first image position data representing the first image position Q1.

The processor 240 may store the generated output image data, and the image data output circuit 250 may transmit the output image data to the display device 400 under the control of the processor 240.

The display device 400 may display the image by using the output image data, and on the image that is displayed by the output image data, the first text TXT1 related to the first voice "☉☉☉" of the first speaker SPK1 may be displayed at the position corresponding to the first image position Q1 of the first speaker SPK1, and the second text TXT2 related to the second voice "☆☆☆" of the second speaker SPK2 may be displayed at the position corresponding to the second image position Q2 of the second speaker SPK2.

According to embodiments, the processor 240 may generate the output image data so that the texts TXT1 and TXT2 are displayed on the display device 400 in the form of a speech bubble. For example, the processor 240 may determine the size of the speech bubble, the position at which the speech bubble is displayed, and the direction of the speech bubble based on the image positions Q1 and Q2 in the image IMG of the speakers SPK1 and SPK2.

The electronic device 200 according to embodiments of the present disclosure may determine the spatial positions of the speakers SPK1 to SPK4 by using the input voice data related to the voices of the speakers SPK1 to SPK4, determine the image positions in the image based on the spatial positions, and display the texts related to the voices of the speakers SPK1 to SPK4 at the positions corresponding to the image positions in the image of the speakers SPK1 to SPK4.

FIG. 7 is a diagram explaining an operation of an electronic device according to embodiments of the present disclosure. Referring to FIGS. 1 to 7, the electronic device 200 may generate the output image data by inserting the texts TXT1 and TXT2 related to the voices of the speakers SPK1 to SPK4 into the input image even if the image positions of the speakers SPK1 to SPK4 are positioned outside the area in which the image IMG is displayed (hereinafter, referred to as "image display area").

Referring to FIG. 7, the second speaker SPK2 is not displayed on the image of the input image data. Nevertheless, the electronic device 200 may generate the output image data by inserting the second text TXT2 related to the second voice "☆☆☆" of the second speaker SPK2 into the input image.

The processor 240 may judge whether at least a part of the second speaker SPK2 is displayed on an outside (e.g., right side) of the image display area by using the input image data and the second image position Q2 of the second speaker SPK2. According to embodiments, the processor 240 may judge whether the second image position Q2 is present on the outside (e.g., right side) of the image display area by using the second image position data representing the second image position Q2 of the second speaker SPK2 and the input image data.

In case that the at least a part of the second speaker SPK2 is displayed on the outside (e.g., right side) of the image display area, the processor 240 may generate the output image data by inserting the second text TXT2 related to the second voice "☆☆☆" into the input image. For example, the processor 240 may insert the second text TXT2 related to the second voice "☆☆☆" into the position adjacent to the second image position Q2 in the image display area. For example, in case that the at least a part of the second speaker SPK2 is positioned on the right side of the image display area, the processor 240 may insert the second text TXT2 onto the right side of the image display area.

Further, for example, in case that the at least a part of the second speaker SPK2 is positioned on the right side of the image display area, the processor 240 may generate the output image data by inserting the text for identifying the second speaker SPK2 into the input image together with the second text TXT2 related to the second voice "☆☆☆". In case that the second speaker SPK2 is not displayed on the image, it is not identified who is the second speaker SPK2 through the display position of the second text TXT2, and thus the text (e.g., name) for identifying the second speaker SPK2 is displayed together with the second text TXT2.

As illustrated in FIG. 7, the second text TXT related to the second voice "☆☆☆" may be inserted into the image together with a phrase "SPK2" representing the second speaker SPK2.

In case that the first image position Q1 of the first speaker SPK1 is positioned inside the image display area, and the second image position Q2 of the second speaker SPK2 is positioned outside the image display area, the processor 240 may insert the first text TXT1 related to the first voice "☉☉☉" of the first speaker SPK1 in a first display type, and insert the second text TXT2 related to the second voice "☆☆☆" of the second speaker SPK2 in a second display type. According to embodiments, the first display type and the second display type may differ from each other. For example, as illustrated in FIG. 7, the first text TXT1 may be displayed in a speech bubble of a solid line, whereas the second text TXT2 may be displayed in a speech bubble of a dashed line.

FIG. 8 is a flowchart explaining an operation of an electronic device according to embodiments of the present disclosure. An operating method to be described with reference to FIG. 8 may be implemented by a program that can be stored in a computer-readable storage medium. Referring to FIGS. 1 to 8, the electronic device 200 may receive the input voice data related to the voices of the speakers SPK1 to SPK4 (S110). According to embodiments, the electronic device 200 may receive the input voice data by using the voice signals received from the plurality of microphones 100.

The electronic device 200 may generate the spatial position data representing the positions of the speakers SPK1 to SPK4 by using the input voice data (S120). According to embodiments, the electronic device 200 may generate the spatial position data representing the positions of the voice sources of the voices, that is, the positions of the speakers, based on the input voice data.

The electronic device 200 may generate the text data corresponding to the voices of the speakers by using the input voice data (S130). According to embodiments, the electronic device 200 may generate the output voice data related to the voices pronounced at the positions corresponding to the spatial position data by using the input voice data, and convert the output voice data into the text data. For example, in case that the first spatial position data represents the first position P1, the electronic device 200 may generate the first output voice data related to the voice pronounced at the first position from the input voice data, and generate the first text data by using the first output voice data. In this case, the first text data may be data for representing the first voice "☉☉☉" of the first speaker as the text.

The electronic device 200 may convert the spatial position data into the image position data (S140). According to embodiments, the electronic device 200 may convert the spatial position data representing the positions of the speakers SPK1 to SPK4 on the spatial coordinate system into the image position data representing the positions of the speakers SPK1 to SPK4 on the image coordinate system by using the stored transform parameters.

The electronic device 200 may generate the output image data by inserting the text related to the output voice data into the image position corresponding to the image position data of the input image (S150). According to embodiments, the electronic device 200 may generate the output image data by synthesizing the input image data with the text related to the output image data.

As described above, although embodiments have been described by the limited embodiments and drawings, those of ordinary skill in the corresponding technical field can make various corrections and modifications from the above description. For example, proper results can be achieved even if the described technologies are performed in a different order from that of the described method, and/or the described constituent elements, such as the system, structure, device, and circuit, are combined or assembled in a different form from that of the described method, or replaced by or substituted with other constituent elements or equivalents.

Accordingly, other implementations, other embodiments, and equivalents to the claims belong to the scope of the claims to be described later.

INDUSTRIAL APPLICABILITY

Embodiments of the present disclosure relate to an electronic device and an operation method for the electronic device.

The invention claimed is:

1. An electronic device comprising:
   an image data receiving circuit configured to receive, from a camera, input image data related to an input image captured by the camera;
   a voice data receiving circuit configured to receive input voice data related to voices of speakers;
   a memory configured to store transform parameters for projecting a spatial coordinate system onto an image coordinate system on the image;
   a processor configured to generate output image data by using the input voice data and the input image data; and
   an image data output circuit configured to output the output image data,
   wherein the processor is configured to:
   generate first spatial position data representing a first spatial position on the spatial coordinate system of a first speaker among the speakers and first text data of a first text related to the voice of the first speaker by using the input voice data,
   convert the first spatial position data into first image position data representing a first image position on the image coordinate system of the first speaker based on the transform parameters, and
   generate the output image data indicating an output image by inserting the first text related to the voice of the first speaker into the input image in accordance with the first image position based on the input image data, the first image position data, and the first text data.

2. The electronic device of claim 1, wherein the input voice data is generated from voice signals generated by a plurality of microphones.

3. The electronic device of claim 2,
   wherein the processor is configured to calculate the first spatial position based on a distance between the plurality of microphones and times when the voice signals are received by the plurality of microphones.

4. The electronic device of claim 1,
   wherein the transform parameters are parameters determined based on:
   an external transform parameter for transforming the spatial coordinate system into a camera coordinate system on the camera, and
   an internal transform parameter for transforming the camera coordinate system into the image coordinate system.

5. The electronic device of claim 4,
   wherein the internal transform parameter is determined based on at least one of a position of the camera on the spatial coordinate system and an image capturing direction of the camera, and
   wherein the external transform parameter is determined based on at least one of a focal length of the camera, a principal point of the camera, and an asymmetric coefficient of the camera.

6. The electronic device of claim 1,
   wherein the processor is configured to:
   generate first setting data for determining a position, a size, and a form of an area on which the first text is displayed by using the first image position data, and
   generate the output image data by inserting the first text into the input image in accordance with the first setting data.

7. The electronic device of claim 1,
   wherein the processor is configured to:
   generate second spatial position data representing a second spatial position on the spatial coordinate system of a second speaker among the speakers and second text data of a second text related to a voice of the second speaker by using the input voice data,
   convert the second spatial position data into second image position data representing a second image position on the image coordinate system of the second speaker based on the transform parameters, and
   generate the output image data by inserting the second text related to the voice of the second speaker into the input image in accordance with the second image position based on the input image data, the second image position data, and the second text data.

8. The electronic device of claim 1,
   wherein the processor is configured to:
   judge whether the first spatial position is positioned within an image display area in which the image is displayed,
   insert the first text into the input image in a first display type when the first spatial position is positioned inside the image display area, and
   insert the first text into the input image in a second display type that is different from the first display type when the first spatial position is positioned outside the image display area.

9. An operation method for an electronic device, comprising:
   receiving, from a camera, input image data related to an input image captured by the camera;
   receiving input voice data related to voices of speakers;
   generating first spatial position data representing a first spatial position on a spatial coordinate system of a first user among the speakers and first text data of a first text related to the voice of the first speaker by using the input voice data;
   converting the first spatial position data into first image position data representing a first image position on an image coordinate system of the input image of the first speaker;
   generating an output image data by inserting a first text related to the voice of the first speaker into the input image in accordance with the first image position based on the input image data, the first image position data, and the first text data; and
   outputting the output image data.

10. The operation method of claim 9,
    wherein the converting of the first spatial position data into the first image position data comprises converting the first spatial position data into the first image position data by using transform parameters for projecting the spatial coordinate system onto the image coordinate system.

11. The operation method of claim 9, further comprising:
    generating second spatial position data representing a second spatial position on the spatial coordinate system of a second speaker among the speakers and second text data of a second text related to a voice of the second speaker by using the input voice data;

converting the second spatial position data into second image position data representing a second image position on the image coordinate system of the second speaker; and generating the output image data by inserting the second text related to the voice of the second speaker into the input image in accordance with the second image position based on the input image data, the second image position data, and the second text data.

12. The operating method of claim 9, wherein the generating of the output image data comprises:

judging whether the first spatial position is positioned within an image display area in which the image is displayed;

inserting the first text into the input image in a first display type when the first spatial position is positioned inside the image display area; and inserting the first text into the input image in a second display type that is different from the first display type when the first spatial position is positioned outside the image display area.

* * * * *